UNITED STATES PATENT OFFICE.

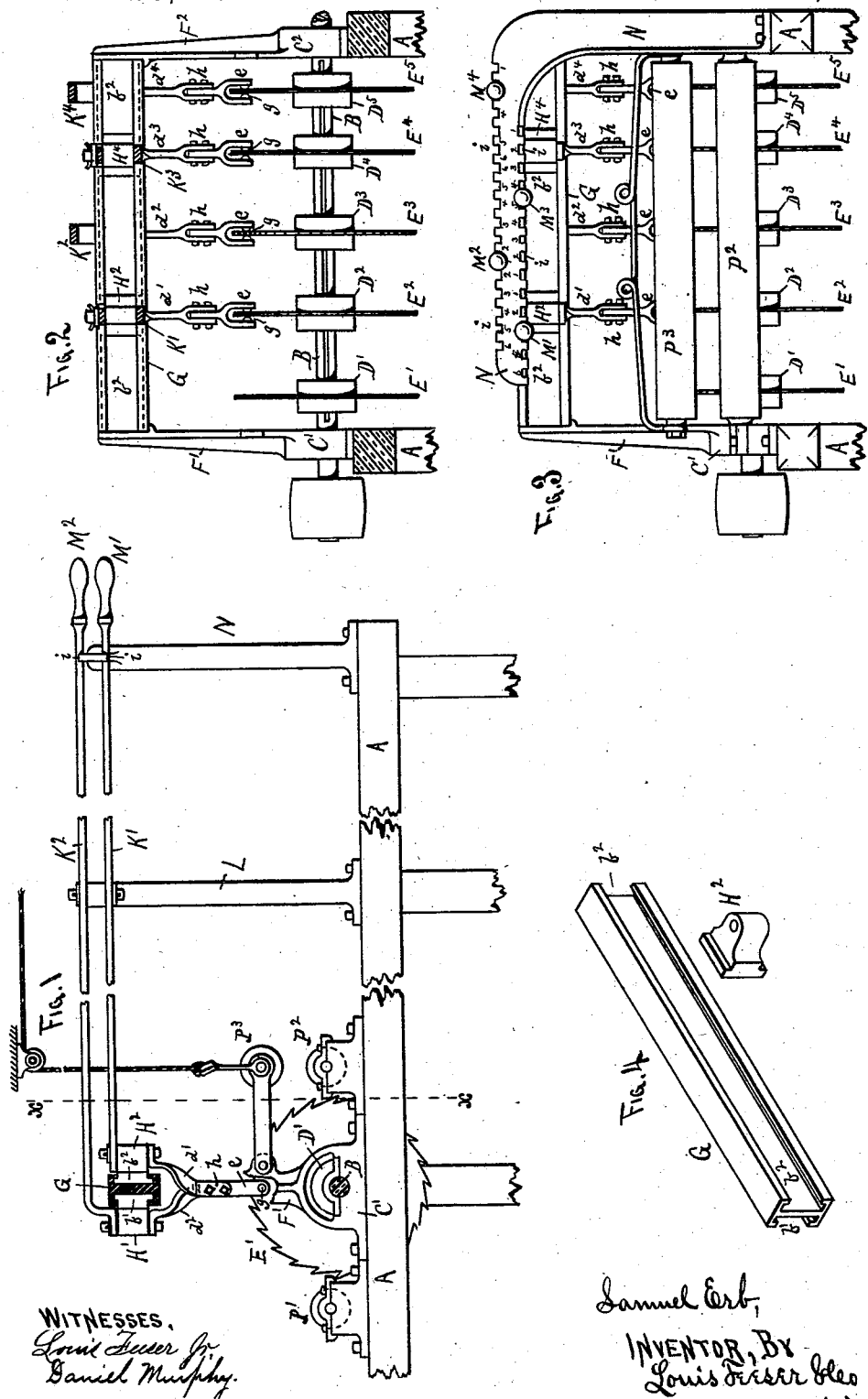

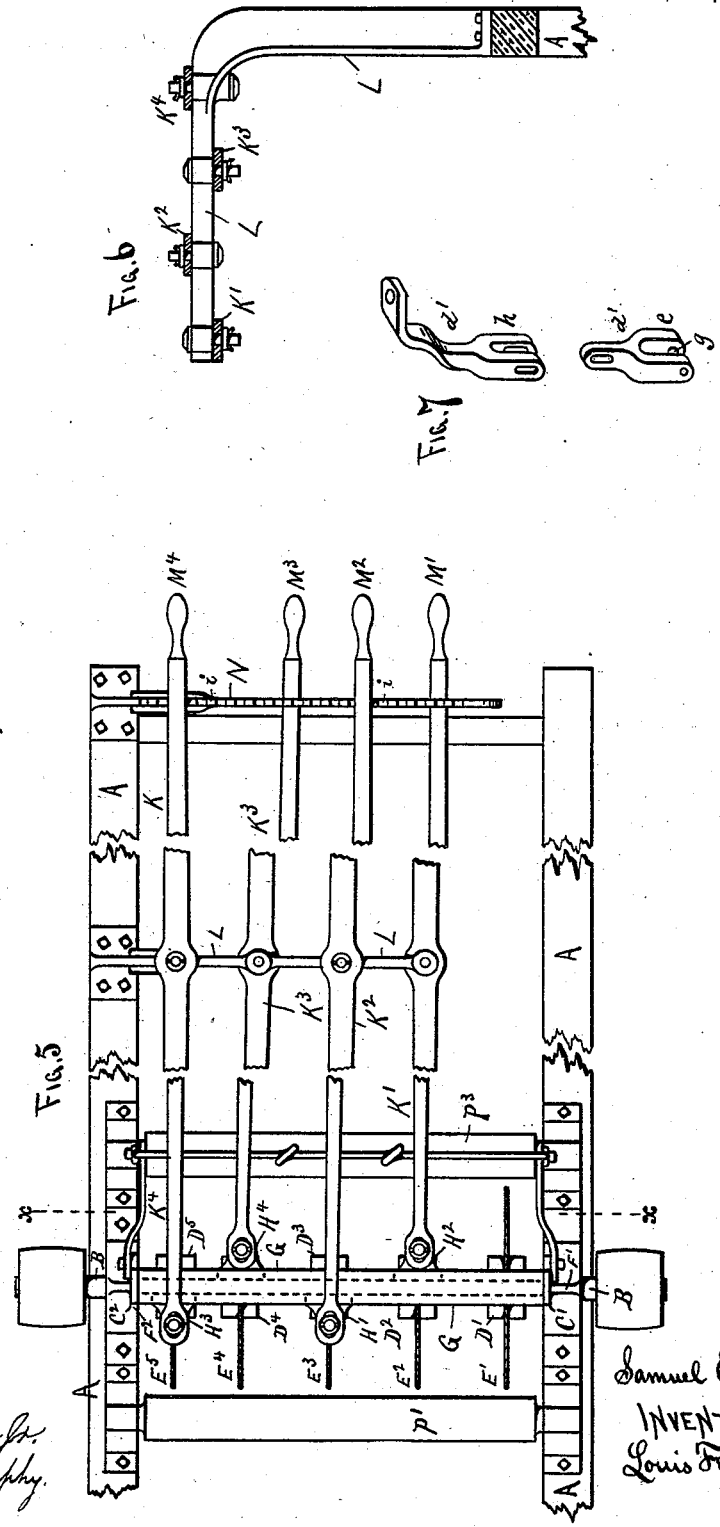

SAMUEL ERB, OF MINNEAPOLIS, MINNESOTA.

METHOD OF ADJUSTING EDGER-SAWS.

SPECIFICATION forming part of Letters Patent No. 289,819, dated December 11, 1883.

Application filed March 19, 1883. (No model.)

*To all whom it may concern:*

Be it known that I, SAMUEL ERB, a citizen of the United States, and a resident of Minneapolis, in the county of Hennepin, in the State of Minnesota, have invented certain new and useful Improvements in the Methods of Adjusting Edger-Saws, of which the following specification is a full, clear, and exact description, reference being also had to the accompanying drawings.

This invention relates to machines for removing the slab-edges from lumber after it has been cut up into boards, and cutting the boards into uniform widths; and it consists in the arrangement and construction of the mechanism whereby the adjustment and guidance of the saws are accomplished, as hereinafter shown and described, and then sought to be specifically defined by the claims.

In the drawings, Figure 1 is a semi-sectional side view foreshortened. Fig. 2 is a cross-sectional view on the line $x\,x$ of Figs. 1 and 5. Fig. 3 is a front elevation. Fig. 4 is a perspective view of the shipper-slide and one of the shipper-heads detached. Fig. 5 is a plan view foreshortened. Fig. 6 is a side view, detached, of the pivot-frame of the shipper-levers. Fig. 7 is a perspective view enlarged and detached, of the adjustable shipper-arm.

A is the frame; B, the mandrel, mounted in bearings $C'\,C^2$ on the frame; $D'\,D^2\,D^3\,D^4\,D^5$, the hubs of the saws, and $E'\,E^2\,E^3\,E^4\,E^5$ the saws, all these parts being arranged in the ordinary manner.

The saw $E'$ and its hub $D'$ are fast upon the mandrel B, while the remaining saws are mounted upon the mandrel with a feather in the mandrel and keys in the hubs, so that while the saws are revolved with the mandrel they can be adjusted along the mandrel, to increase or decrease the distance between the saws.

The bearings $C'\,C^2$ are extended upward at $F'\,F^2$, and adapted to support a cross frame or bar, G, by its ends between them, as shown. T-slots $b'\,b^2$ are formed in the sides of the bar G, as shown in Fig. 4, in which a number of small slides or blocks, $H'\,H^2\,H^3\,H^4$—one for each of the movable saws $E^2\,E^3\,E^4\,E^5$—are arranged to slide from side to side. The slides $H'$ and $H^3$ are set in the slot or groove $b'$, while the slides $H^2\,H^4$ are set in the slot or groove $b^2$, and each of the slides is provided with an arm, $d'\,d^2\,d^3\,d^4$, projecting down therefrom, and each one adapted to inclasp one of the saws $D^2\,D^3\,D^4\,D^5$ by a fork, $e$, on its lower end, as shown. On the inner surfaces of each of the forked ends $e$ small wooden or other suitable knobs, $g$, are placed, between which the saws run, the forks thus serving as guides to the saws. Each of the arms $d'\,d^2\,d^3\,d^4$ is made in two parts, as shown in Fig. 7, and the joint formed by bolting together the two parts at $h$, with two bolts at each joint to secure stiffness, while, by simply loosening one of the bolts and removing the other, the lower parts of arms may be turned up clear of the saws, to permit the latter to be removed. The holes for the bolts of these joints $h$ will be slotted, so that the lower forked parts, $e$, may be adjusted higher and lower, to adjust the wooden blocks $g$ to the saw as it wears down by filing, &c.

$K'\,K^2\,K^3\,K^4$ are four long levers pivoted to a frame or bracket, L, secured to the frame A, and each lever connected at one end loosely by pins to the slides $H'\,H^2\,H^3\,H^4$, as shown, while the other ends of the levers are provided with handles $M'\,M^2\,M^3\,M^4$, and arranged to rest above and below a bracket, N, secured to the forward end of the frame A, as shown, and provided with notches $i$ in its upper and lower edges. The levers $K'\,K^3$ pass below the brackets L and N, while the levers $K^3\,K^4$ pass above the same brackets, as shown. By this arrangement of the slides $H'\,H^3$ and $H^2\,H^4$ upon opposite sides of the frame G, and the levers $K'\,K^2\,K^3\,K^4$ upon opposite sides of the brackets L N, each slide and each lever may be moved from side to side just twice as far in the same space as they could be moved were the slides all placed upon one side of the frame G, and the levers all on the same side of the brackets L N. By arranging them as shown, the upper levers may be moved from side to side over the lower ones without interfering with them, and vice versa. Each of the levers $K'\,K^2\,K^3\,K^4$ will be provided with a small lip adapted to fit into the notches $i$ in the bracket N, so that the levers will be securely held from any side-play wherever placed. By this arrangement, it will be readily seen, the moving of the levers $K'\,K^2\,K^3\,K^4$ from side to side along the notched bracket N will cause the slides H' H² H³ H⁴ to be moved in the opposite direction in the frame G, and through the medium of the forked arms $d'$ $d^2$ $d^3$ $d^4$ this movement will be communicated to the saws D² D³ D⁴ D⁵, so that the relative distances between the saws may be easily and quickly adjusted from the front end of the saw-table A.

The table A is usually about twenty-four feet long, with the saws at the center, and the bracket L will be about six feet from the saw-mandrel, which will leave the levers K' K² K³ K⁴ six feet long from their pivotal points to the handles M' M² M³ M⁴. In the drawings, Figs. 1 and 5, the table A and levers K' K² K³ K⁴ are shown with portions of their lengths broken out, to foreshorten them for the convenience of drawing; but in practice the above-described proportions will be followed usually, although they may be varied to suit different circumstances.

If the notches $i$ be formed to correspond to a scale of inches and fractions of inches and marked upon the standard N, as shown in Fig. 3, the operator can readily set the saws to cut boards of any desired width by adjusting the levers accordingly.

P' P² P³ are the feed-rollers, arranged in the ordinary manner. There are several important advantages gained by this method of arranging the saw-adjusting mechanism over the method generally used.

In adjusting mechanisms with which I am acquainted, the parts are all beneath the frame A and the line of the feed-rollers P' P² P³, and inconvenient to operate, while in my arrangement all the parts are above the table A and feed-rollers P' P² P³, and convenient to operate and adjust, and easily accessible for repairs or the removal and replacing of the saws.

In the ordinary edger-saw many accidents occur from broken saws, or pieces of wood being thrown off by the saws; but by arranging all the parts above the saws and between the operator and the saws they form a shield or guard to the saws. In the old method the presence of long lumber on the table, with its ends covering the ends of the adjusting mechanism, it is very inconvenient to adjust the saws, while by my arrangement the adjusting mechanism is never interfered with by the lumber.

The brackets L N may be suspended from the floor above or other part of the mill, so as to leave the table A in front of the saws entirely unobstructed; but the action and results are the same.

Having described my invention and set forth its merits, what I claim is—

1. In a machine for edging lumber, the combination, with a saw arbor or mandrel, saws movable laterally thereon, and means for feeding the lumber to the saws, of a frame or bar, G, situated above the saws and feed mechanism, and movable saw-guides H' H² H³ H⁴, adjustable to various positions on the said frame or bar, and provided with guide-arms $d'$ $d^2$ $d^3$ $d^4$, adjustable to and from the saws, substantially as and for the purpose herein specified.

2. The saw-guides H' H² H³ H⁴, arranged upon the frame or bar G over the saws, and provided with downwardly-projecting arms $d'$ $d^2$ $d^3$ $d^4$, having forked parts $e$ $e$ $e$ $e$ hinged or jointed thereto, substantially as and for the purpose herein specified.

3. In combination with the saw arbor or mandrel, laterally-movable saws, and mechanism for feeding the lumber to the saws, the frame or bar G, situated above the saws and feed mechanism, saw-guides H' H² H³ H⁴, adjustable on the frame or bar, and pivoted levers K' K² K³ K⁴, arranged above the main frame, substantially as described, for actuating the said guides.

4. The combination of two sets of movable guides, H' H³ and H² H⁴, situated on opposite sides of the frame or bar G, and two sets of actuating-levers, K' K³ and K² K⁴, arranged in two ranks, substantially as and for the purpose herein specified.

In testimony whereof I have hereunto set my hand in presence of two subscribing witnesses.

SAMUEL ERB.

Witnesses:
C. N. WOODWARD,
LOUIS FEESER, Sr.